United States Patent
Sun (10) Patent No.: US 12,466,417 B2
(45) Date of Patent: *Nov. 11, 2025

(54) AUTOMOTIVE VEHICLE CONTROL CIRCUIT

(71) Applicant: ZF Automotive UK Limited, Solihull (GB)

(72) Inventor: Xiao-Dong Sun, Solihull (GB)

(73) Assignee: ZF Automotive UK Limited, Solihull (GB)

( * ) Notice: Subject to any disclaimer, the term of this patent is extended or adjusted under 35 U.S.C. 154(b) by 92 days.

This patent is subject to a terminal disclaimer.

(21) Appl. No.: 18/270,037

(22) PCT Filed: Dec. 30, 2021

(86) PCT No.: PCT/GB2021/053445
§ 371 (c)(1),
(2) Date: Jun. 28, 2023

(87) PCT Pub. No.: WO2022/144549
PCT Pub. Date: Jul. 7, 2022

(65) Prior Publication Data
US 2024/0051556 A1 Feb. 15, 2024

(30) Foreign Application Priority Data
Dec. 31, 2020 (GB) .................................. 2020839

(51) Int. Cl.
| *B60W 50/06* | (2006.01) |
| *B60W 50/00* | (2006.01) |
| *G05B 13/02* | (2006.01) |

(52) U.S. Cl.
CPC ........ *B60W 50/06* (2013.01); *B60W 50/0098* (2013.01); *G05B 13/027* (2013.01);
(Continued)

(58) Field of Classification Search
CPC ............ B60W 50/06; B60W 50/0098; B60W 2050/0011; B60W 2050/0012; B60W 2050/0014; G05B 13/027
See application file for complete search history.

(56) References Cited

U.S. PATENT DOCUMENTS

| 10,829,149 B1 * | 11/2020 | Garimella .............. B62D 6/001 |
| 2018/0201299 A1 | 7/2018 | Ashtari |
| 2019/0248411 A1 | 8/2019 | Peng et al. |

FOREIGN PATENT DOCUMENTS

| CN | 107972667 A | 5/2018 |
| CN | 109177744 A | 1/2019 |

(Continued)

OTHER PUBLICATIONS

"A kind of man-machine harmony control method of deviation auxiliary system" English translation of CN107972667B. From Espacenet. (Year: 2019).*

(Continued)

*Primary Examiner* — Naeem Taslim Alam
(74) *Attorney, Agent, or Firm* — Kristin L. Murphy (57) ABSTRACT

An automotive vehicle control circuit can include a PID Controller that receives at an input a set point signal for the closed-loop control system and provides as an output a control signal that is fed to the motion control system. The PID controller is arranged in a closed-loop configuration with the motion control system to minimise an error value indicative of the difference between the demanded behaviour of the motion control system as indicated by the demand signal and the actual behaviour of the motion control system. The control circuit can include a neural network which has an input layer of neurons, at least one hidden layer of neurons, and an output layer comprising at least one output neuron, in which the neural network comprises a feedforward neural network that receives at the input layer of input
(Continued)

neurons the demand signal, the drive signal output from the controller and the error value. The neural network is configured to determine one or more of the P gain, I gain and D gain terms used by the PID controller, and the neural network receives as a feedforward term at least one additional discrete environmental variable.

16 Claims, 5 Drawing Sheets

(52) U.S. Cl.
   CPC ............... *B60W 2050/0011* (2013.01); *B60W 2050/0012* (2013.01); *B60W 2050/0014* (2013.01)

(56) References Cited

FOREIGN PATENT DOCUMENTS

| | | | | |
|---|---|---|---|---|
| CN | 109405846 A | | 3/2019 | |
| CN | 107972667 B | * | 7/2019 | ............ B60W 30/12 |
| CN | 110775057 A | | 2/2020 | |
| CN | 111038477 A | | 4/2020 | |
| DE | 102017220973 A1 | | 5/2019 | |

OTHER PUBLICATIONS

International Search Report and Written Opinion for PCT/GB2021/053445 mailed Feb. 14, 2022 (10 pages).

* cited by examiner

AUTOMOTIVE VEHICLE CONTROL CIRCUIT

CROSS-REFERENCE TO RELATED APPLICATIONS

This application is a national stage of International Application No. PCT/GB2021/053445, filed Dec. 30, 2021, the disclosure of which is incorporated herein by reference in its entirety, and which claimed priority to UK Patent Application No. 2020839.3, filed Dec. 31, 2020, the disclosure of which is incorporated herein by reference in its entirety.

TECHNICAL FIELD

This disclosure relates to improvements in automotive vehicle control circuits of a vehicle motion control system, and in particular to a control circuit that includes a PID controller.

BACKGROUND

A modern vehicle includes a wide range of motion control systems, with two very common systems comprising electric power steering (EPS) and electrically actuated brakes. An electric power steering system assist the driver in turning the steering wheel using an actuator in the form of a motor to apply an assistance torque. An electrically actuated brake system similarly uses an actuator to apply the brakes in response to the driver pressing a brake pedal.

In each case, by feeding suitable control signals to the system the vehicle dynamics or motions can be affected independent of the inputs from the driver. Examples of such systems include a lane keep assist (LKA) system in which the steering is operated by the position control so that the vehicle keeps within a lane on a highway, and emergency braking in which the brakes are operated when a hazard is detected independent of the action of the driver.

Any motion control system on a vehicle can produce some kind of output in response to an input signal, and can include a controller of some kind for controlling the actuator. One suitable kind of controller that is commonly used is the PID controller. In use a set point value representing some demanded behaviour of the actuator, such as the current of a motor, is combined with a measure of that behaviour to provide an error signal indicative of the difference between what is demanded and what is actually happening. This error signal is fed into the PID controller which in turn outputs a control signal for the actuator to track the setpoint value, the PID controller constantly adjusting the control signal so that the error signal is minimised and the tracking is achieved. This forms a closed loop control of the motion control system and can provide a highly accurate control for the actuator involved A PID controller is so called because it can use the three control terms, each typically expressed as a gain value Kp, Ki, Kd, which has a proportional, integral and derivative control effect on the signal output feedback from the control system.

SUMMARY

Figure 1:
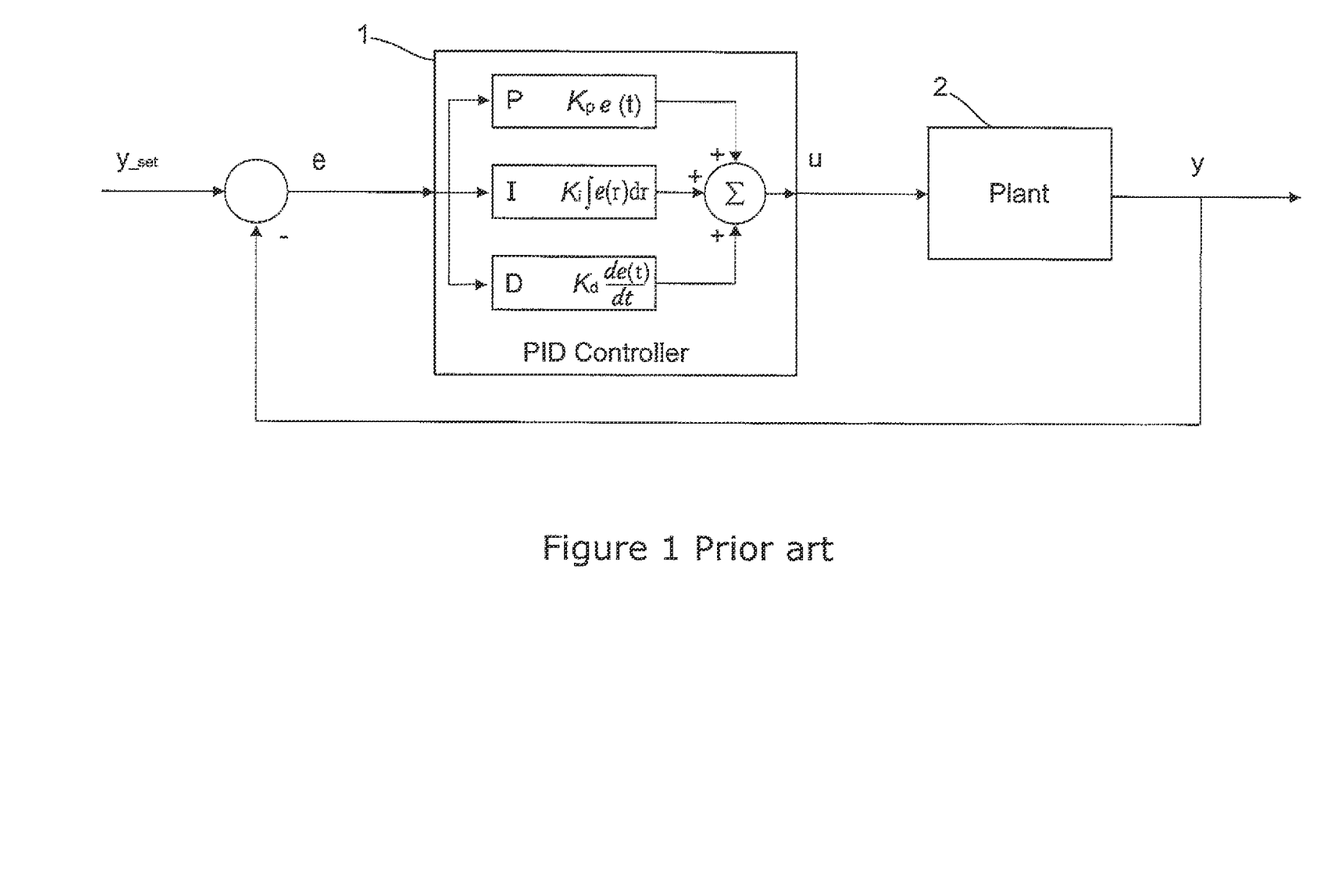
FIG. 1 is a schematic of a general PID Controller incorporated into a feedback loop where it controls the operation of a plant such as an electric motor.

Referring to FIG. 1, a PID controller 1 for an actuator 2 or other controlled plant calculates an error value e as the difference between a desired setpoint Y_set and the behaviour of the controlled plant and applies a correction based on the proportional, integral, and derivative control terms from the error. The controller attempts to minimize the error over time by adjustment of the control signal u that is output from the controller and used to control the plant. In the case of a plant comprising a three phased direct current motor, this control actuation signal may define the motor current in the dq reference frame or the specific voltage waveforms that are to be applied to the motor phases and may be fed to an inverter which in turn generates pulse width modulation signals that are applied to switches of an inverter.

The performance of the controller 1 can depend significantly on the selection of the three gain terms, P I and D and the process of selecting the gain terms is known in the art as tuning of the controller. The gain terms can generally be set to fixed values during a design phase of the system, and may be modified to suit a particular application in a vehicle. A problem with the fixing of the gain terms is that over time the tuning can become suboptimal as the system they are controlling changes internally in the features away from that in the design phase, and they can be suboptimal for certain changes in the operating conditions of the vehicle.

The applicant has proposed a control circuit which ameliorates the limitations of prior art automotive vehicle control circuits as described above.

According to a first aspect the disclosure provides an automotive vehicle control circuit incorporated into a motion control system of a vehicle which is responsive to an output of the vehicle control circuit, in which the control circuit comprises:

a PID Controller which receives at an input a set point signal for the closed-loop control system and provides as an output a control signal that is fed to the motion control system, the controller being arranged in a closed loop with the motion control system to minimise an error value indicative of the difference between the demanded behaviour of the motion control system as indicated by the demand signal and the actual behaviour of the motion control system, and a neural network which has an input layer of neurons, at least one hidden layer of neurons, and an output layer comprising at least one output neuron, in which the neural network comprises a feedforward neural network that receives at the input layer of input neurons the demand signal, the drive signal output from the controller and the error value, and in which the neural network is configured to determine one or more of the P gain, I gain and D gain terms used by the PID controller, and further in which the neural network receives as a feedforward term at least one additional discrete environmental variable.

The applicant has appreciated that the use of a neural network in an automotive motion control system to tune the gain terms of a PID controller which is fed with at least one additional discrete environmental variable allows for an additional degree of control of the vehicle motion control system.

The neural network may determine the gain values as respective nodal values within a hidden layer of the neural network.

By environmental variable we may mean a variable which is indicative of a parameter that is not used with the control loop of the PID controller.

The environmental variable may comprise at least one of the following commonly found in a vehicle motion control system:

the speed of the vehicle for most of the vehicle motion control, road/traffic measurements such as the curvature, heading and speed limit etc.

vehicle acceleration/reaction force
the motor rotation speed/angle for the current/torque control
steering torque or angle
vehicle turn signal condition, e.g. turn indicated or turn not indicated The skilled person will understand that this is not intended to be an exhaustive list and other variables may be used within the scope of the disclosure.

The neural network may be fed with the set point signal input to the controller, and with the error signal.

The neural network controller should be realised in the discrete control form.

The signals input to the neural network may be updated periodically, and between each update the neuron values may be updated in response prior to inputting updated values to the neural network.

Each of these variables can vary as the vehicle is operated, and providing the at least one additional variable at the input point to the neural network provides a degree of further adaptation to the control of the actuator, enabling the error value better to be minimised in accordance with the environmental conditions change in use.

The weights and the neurons of the neural network may be pre-set prior to first use of the neural network to define a set of values for the gains P, I and D which minimise the error value assuming that the system operates for the nominal internal and external conditions, and the environmental value has no influence.

The pre-set weights and neurons may be stored in an area of memory.

During use of the control system the weights may be updated by a gradient-descent backpropagation scheme each time a new set of input values is supplied to the neural network, and the updated weights combine with the input values are used to update the neurons.

The weight update step may be controlled by a learning strategy unit defining the profile and step for the update.

Expressed mathematically the inputs and outputs from the neural network may comprise:

$y^*\_set$ & $y^*$: discrete setpoint (target) & the measured behaviour of the actuator,
$e^*$: the tracking error=$y^*\_set-y^*$:
$u^*$: discrete PID control;
$U^*$: discrete environment variables
Kp, Ki and Kd: discrete P (proportional), I (integral), D (derivative) Control Gains respectively.

In an exemplary arrangement the Neural Network is configured to perform a gradient descent learning for the inter-neuron weightings.

In an exemplary arrangement the neural network may determine the weights using a back-propogation algorithm.

The or each environmental variable by the fed into the neutral network at an input layer. The control gains may be calculated as the neuron point values of respective neurons of a hidden layer of the neural network, and the control signal value may be generated at an output neuron of the neural network.

Once a new set of inputs have been fed to the input neurons of the neural network, the values of the hidden neurons can be calculated by a perceptron model upon the input values combined with the interneuron weightings applied between the input layer and the hidden layer.

The neural network may be configured to make the error term e(k) a minimum using so-called the gradient descent back-propagation algorithm to perform the weights W training and update for the error function minimisation, to achieve the optimal PID control gains (Kp, Ki and Kd), hence the desired PID control for the output signal.

The neural network may have a single hidden layer of neurons that connect the input layer neurons to the output layer.

The neural network PID controller may be arranged such that for each time step the following steps are performed:
Input values updated;
Weightings updated following the gradient descent back propagation scheme control combining with the input values, error and last control signal;
The neuron values update calculation from the perceptron model using the input neurons and the weighting gains (W) applied to connections between the input neurons and the hidden layer neurons;
Controller PID gain values updated based on the neuron values;
Control signal output from the controller generated by applying gains to the error signal input to the PID controller.

The propagation of the signals through the neural network may be performed each time a new error signal is input to the PID controller and the output of the controller may only be generated once the neural network has completed the back propagation.

The motion control system may include an actuator that comprises an electric motor although other actuators may be provided within the scope of the disclosure.

The motion control system may comprise a driver assistance system such as an automatic braking system or a lane keeping assistance system, or an autonomous driving system such as an automatic lane guided steering system, or an active cruise control system, or an active braking and acceleration system. It may comprise any vehicle motion system which can benefit from the use of a controlled actuator to provide an autonomous or semi-autonomous control of a dynamic characteristic of the vehicle. The desired behaviour of the motion control system can typically be the motion of the vehicle, with this achieved by controlling the behaviour of one or more actuators.

According to a second aspect the disclosure provides an automotive motion control system comprising at least one controller of the first aspect that drives the actuator.

The automotive system may comprise two or more control circuits of the first aspect.

BRIEF DESCRIPTION OF DRAWINGS

There will now be described by way of example only, an exemplary arrangement of the present disclosure of which:

FIG. 3 a) is a schematic of a PID controller for a generic plant of a motion control system that includes a neural network to determine the gains of a PID controller;

FIG. 3 b) is a schematic of the neural network adaptive PID control system for controlling a motor within the motion control system;

DETAILED DESCRIPTION

Figure 2:
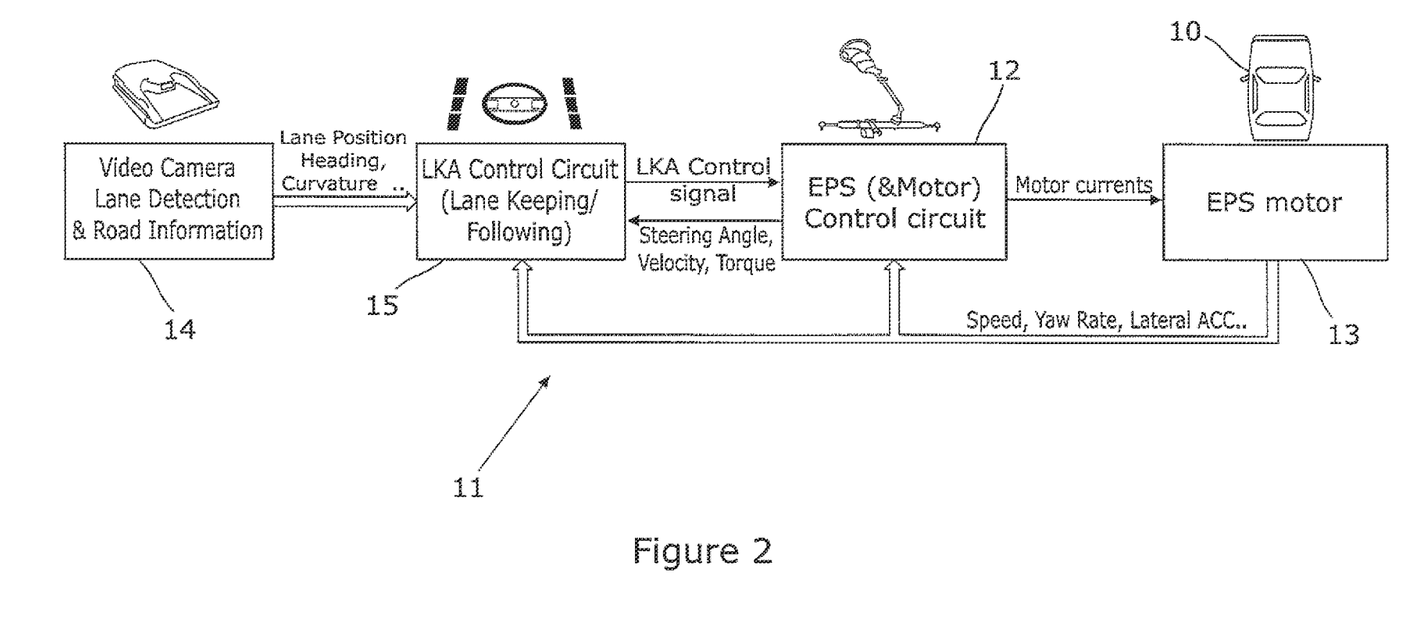
FIG. 2 is a schematic view of a vehicle fitted with a motion control system that falls within the scope of an aspect of the disclosure that provides a lane keep assistant function to help a driver steering a vehicle.

As shown in the FIG. 2, a vehicle 10 may be fitted with a vehicle motion control system 11 that assists the driver in operating the vehicle or may act wholly or partially independently of the driver to affect the dynamics of the behaviour. The example shown is a lane keep assist (LKA) motion control system that includes an electric power steering system (EPS) having a control circuit 12 and an electric motor 13. The motor 13 in use applies an assistance torque to a part of the steering to help the driver to steer the vehicle 10 and keep it travelling in a lane on the road.

At the higher level/outer loop a set of signals are generated by a signal processor that receives images of the highway from one or more video cameras 14. These include a lane position representing where the vehicle is within the lane and the curvature of the lane. These signals are fed to an LKA control circuit 15 which commands the vehicle to steer towards the centre of a lane. The LKA control circuit achieves this by comparing a target position with a feedback measure of actual position in the lane.

Figure 3:
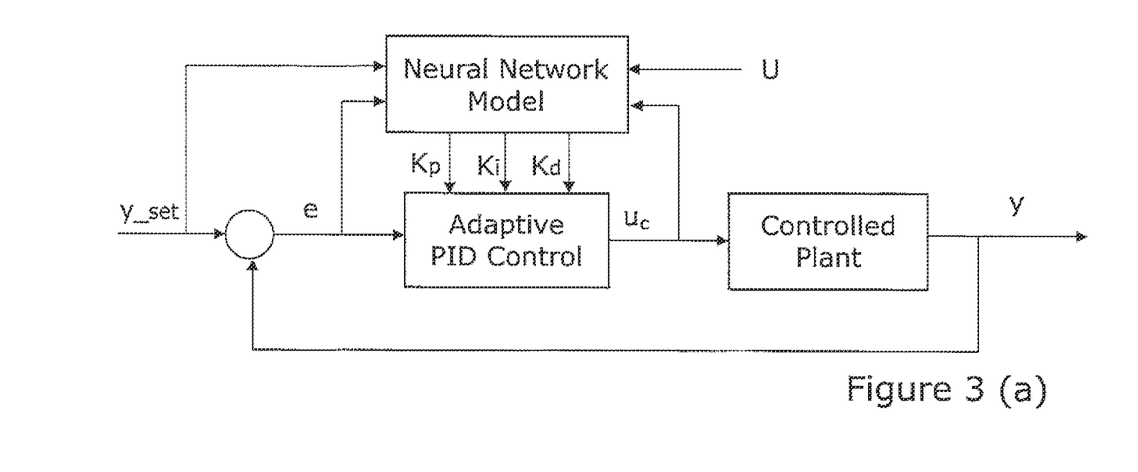

As best seen in FIG. 3(*b*) the motor 13 comprises a multi-phase pulse width modulated synchronous motor that outputs a torque in response to a control signal Uc output from the LKA control circuit. This control signal comprises a target motor current in the DQ frame of reference. The EPS control circuit 12 is shown in more detailed in FIG. 3(*b*) and can be seen to comprises a PID controller 16 which together with the motor forms a closed feedback loop with a measurement of a parameter of the motor being fed back to the input side of the controller. In this example the measurement can be made of the motor phase currents (see FIG. 3(*b*)).

The EPS control circuit includes a PID Controller that receives at an input a set point signal for the actuator which in this example is a demanded motor current value Idq_set. The controller is configured to minimise an error value indicative of the difference between the demanded motor current value Idq_set and the measured motor current Idq.

As is well known, the output of the PID controller—in this case the drive current value—is determined as a sum of three terms, a proportional term, an integral term and a differential term. Each term is calculated by multiplying the error signal value by a respective gain term Kp, Ki, and Kd, otherwise known as P I and D terms.

These gain terms are calculated in the example of FIG. 2 by the neural network 17 as shown in FIG. 3(*b*). The neural network 17 comprises a set of neurons 18 which receive inputs, followed by the process to combine the inputs with their internal state and weights, and perform the neuron values calculation using an activation function, and produce output using an output function. The initial inputs are external data which in this example comprise environmental variables that are relevant to the torque control for the lane keep assistance system.

The neurons 18 are arranged in a network of connections, each connection providing the output of one neuron as an input to another neuron. Each connection is assigned a weight that represents its relative importance. The propagation function computes the input to a neuron (activation function) from the outputs of its predecessor neurons and their connections as a weighted sum.

Figure 4:
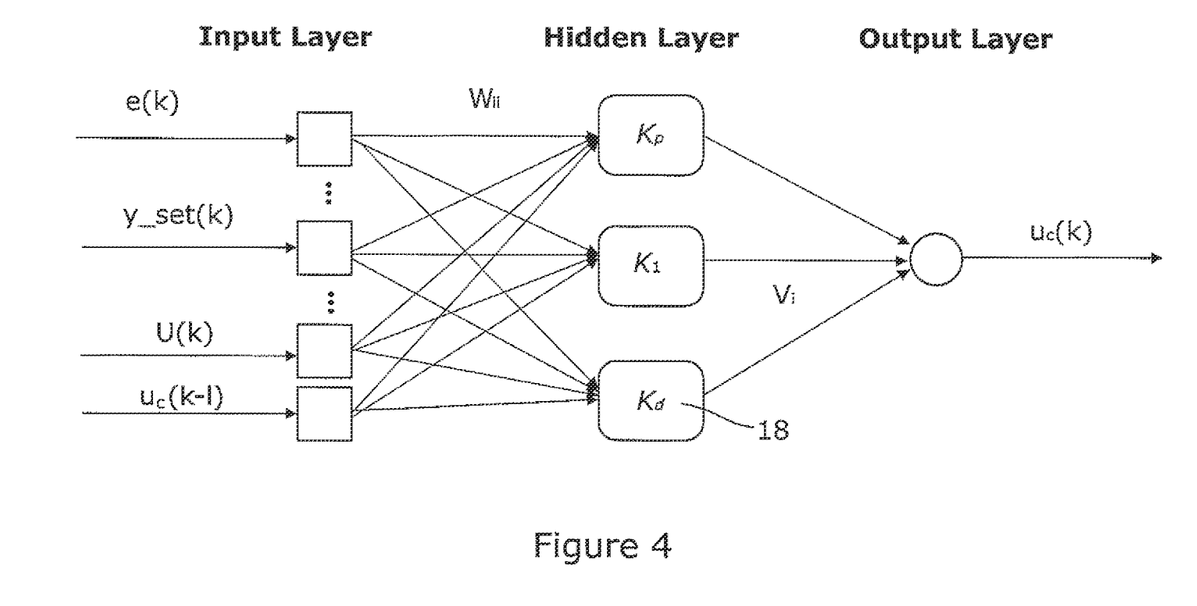
FIG. 4 is a representation of the interneuron connections of the neural network of FIG. 3(b)

The specific neural network used in the motor control example of FIG. 3(*b*) is a feedforward network with one hidden layer. The network has an input layer of neurons, an output layer comprising at least one output neuron, and at least on hidden layer of neurons. This is shown in FIG. 4. The neural network is configured to perform gradient-descent backpropagation learning to provide the P gain, I gain and D gain terms used by the PID controller. The neural network in this example is a single hidden layer neural network in which the hidden layer has three neurons, each neuron defining a value of a respective gain term for the PID controller. The neural network has a single output neuron defining the value of the drive signal for the motor.

Figure 5:
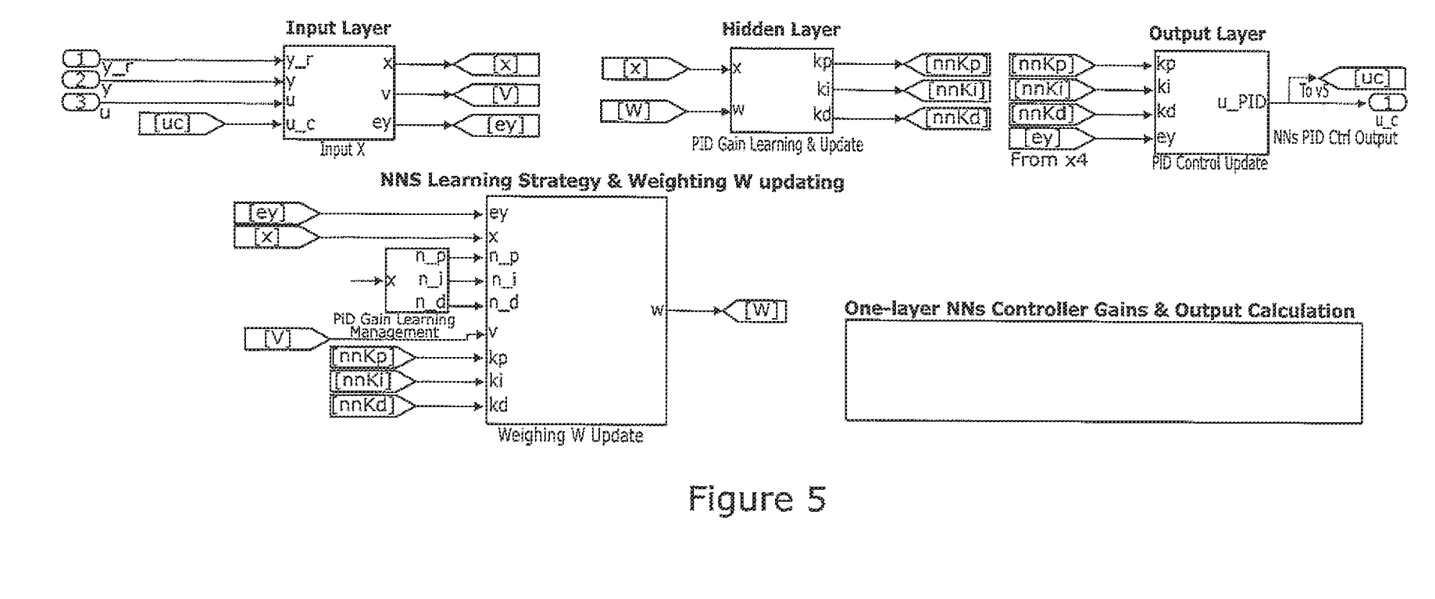
FIG. 5 shows the configuration and each the layer function block of the neural network PID controller implemented in Matlab/Simulink

As shown in FIGS. 4 and 5, the neural network receives at the input neurons the error value e, demand signal y_set, the control signal $u_c$ output from the PID controller.

The Neural network also receives as a feedforward term a number of additional discrete environmental variables. In this example one of the feedforward environmental variables can be the steering angle or the motor rotation speed or the vehicle speed Vspd.

The operation of the neural network and the discrete PID controller during use of the LKA system is as follows:

Step 1—the input values fed to the input layer neurons of the neural network are updated as is the set point signal fed to the PID controller;

Step 2: Obtain the kth step learning coefficient η(K) from the simple (adaptive) formula Step 3—The Weightings between neurons in the neural network are updated following a back-propagation scheme combining with the input values, previous control signal and learning coefficient update Step 4—The Controller gain values are updated based on the hidden layer neuron values calculation by the perceptron model from the input neurons and the weighting gains W applied to connections between the input neurons and the hidden layer neurons, Step 5—the updated control signal $u_c$ is output from the PID controller generated by applying gains to the error signal input to the PID controller;

Step 6—the system output, here the motor current, and the associated environment variable(s), are measured and the values are fed back to the input of the PID controller Step 7—repeat steps 1 to 6.

The invention claimed is:

1. An automotive vehicle control circuit incorporated into a motion control system of a vehicle, wherein the system is responsive to an output of the automobile vehicle control circuit, in which the automotive vehicle control circuit comprises:

a PID Controller configured to receive at an input a set point signal for a closed-loop control system and provides as an output a control signal that is fed to the motion control system, the PID controller arranged in a closed-loop configuration with the motion control system to minimise an error value indicative of the difference between the demanded behaviour of the motion control system as indicated by a demand signal and the actual behaviour of the motion control system, and a neural network including an input layer of neurons, at least one hidden layer of neurons, and an output layer comprising at least one output neuron, in which the neural network comprises a feedforward neural network that receives at the input layer of neurons the demand signal, the drive signal output from the controller and the error value, and in which the neural network is configured to determine one or more of P gain, I gain and D gain terms used by the PID controller,
and further in which the neural network receives as a feedforward term at least one additional discrete environmental variable.

2. A control circuit according to claim 1 in which the neural network determines the one or more gain terms as respective nodal values within a hidden layer of the neural network.

3. A control circuit according to claim 1 in which the at least one additional discrete environmental variable comprises at least one of the following:
   a speed of the vehicle,
   road/traffic measurements,
   a vehicle acceleration/reaction force,
   a motor rotation speed/angle for a current/torque control,
   a steering torque or angle, or
   a vehicle turn signal condition.

4. A control circuit according to claim 1 in which the neural network is fed with the set point signal input to the PID controller, and with the error value.

5. A control circuit according to claim 1 in which the demand signals, the drive signal and the error value input to the neural network are updated periodically.

6. A control circuit according to claim 1 in which weights and neurons of the neural network are pre-set prior to a first use of the neural network to define a set of values for the gain terms P, I and D that minimise the error value assuming that the system operates for the nominal internal and external conditions, and the environmental value has no influence.

7. A control circuit according to claim 1 whereby during use of the control system weights are updated by a gradient-descent backpropagation scheme each time a new set of input values is supplied to the neural network, and the updated weights combined with the input values are used to update the neurons.

8. An automotive motion control system comprising an actuator and at least one control circuit according to claim 1 that drives an actuator.

9. An automotive vehicle control circuit comprising:
   a PID Controller configured to receive at an input a set point signal for a closed-loop control system and provides as an output a control signal to a motion control system, the PID controller arranged in a closed-loop configuration with the motion control system to minimise an error value indicative of the difference between the demanded behaviour of the motion control system as indicated by a demand signal and the actual behaviour of the motion control system, and
   a neural network including an input layer of neurons, at least one hidden layer of neurons, and an output layer comprising at least one output neuron,
   the neural network comprising a feedforward neural network configured to receive at the input layer of neurons the demand signal, the drive signal output from the controller and the error value,
   the neural network configured to determine one or more of P gain, I gain and D gain terms used by the PID controller,
   wherein the neural network receives as a feedforward term at least one additional discrete environmental variable.

10. A control circuit according to claim 9 in which the neural network determines the one or more gain terms as respective nodal values within a hidden layer of the neural network.

11. A control circuit according to claim 9 in which the at least one additional discrete environmental variable comprises at least one of the following:
    a speed of the vehicle,
    road/traffic measurements,
    a vehicle acceleration/reaction force,
    a motor rotation speed/angle for a current/torque control,
    a steering torque or angle, or
    a vehicle turn signal condition.

12. A control circuit according to claim 9 in which the neural network is fed with the set point signal input to the PID controller, and with the error value.

13. A control circuit according to claim 9 in which the demand signal, the drive signal, and the error value input to the neural network are updated periodically.

14. A control circuit according to claim 9 in which weights and neurons of the neural network are pre-set prior to a first use of the neural network to define a set of values for the gain terms P, I and D that minimise the error value assuming that the system operates for the nominal internal and external conditions, and the environmental value has no influence.

15. A control circuit according to claim 9 whereby during use of the control system weights are updated by a gradient-descent backpropagation scheme each time a new set of input values is supplied to the neural network, and the updated weights combined with the input values are used to update the neurons.

16. An automotive motion control system comprising an actuator and at least one control circuit according to claim 9 that drives an actuator.

* * * * *